May 15, 1951  E. C. OLIVER  2,552,860
FLUID POWER DEVICE
Filed June 27, 1945  3 Sheets-Sheet 1
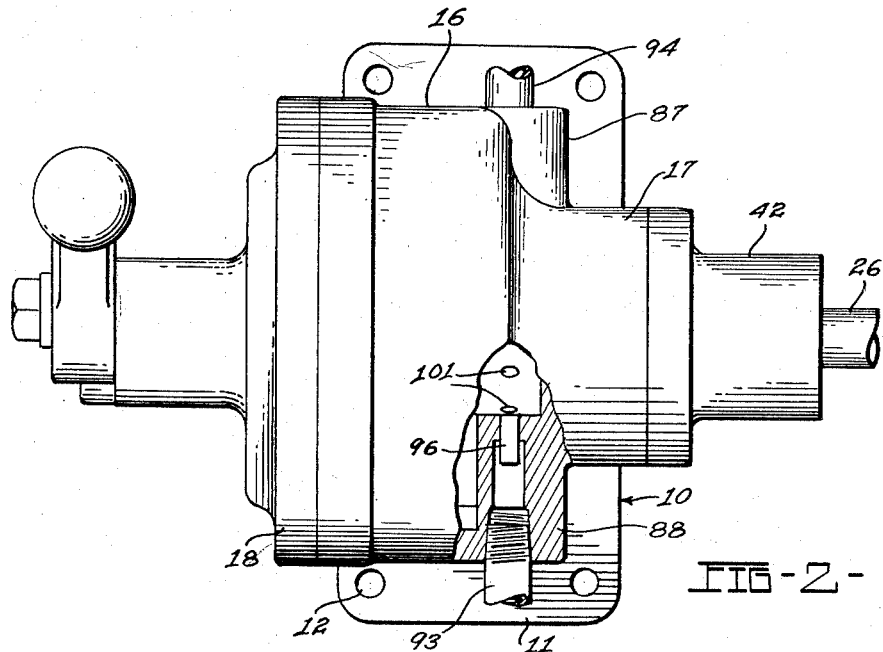
FIG-2-
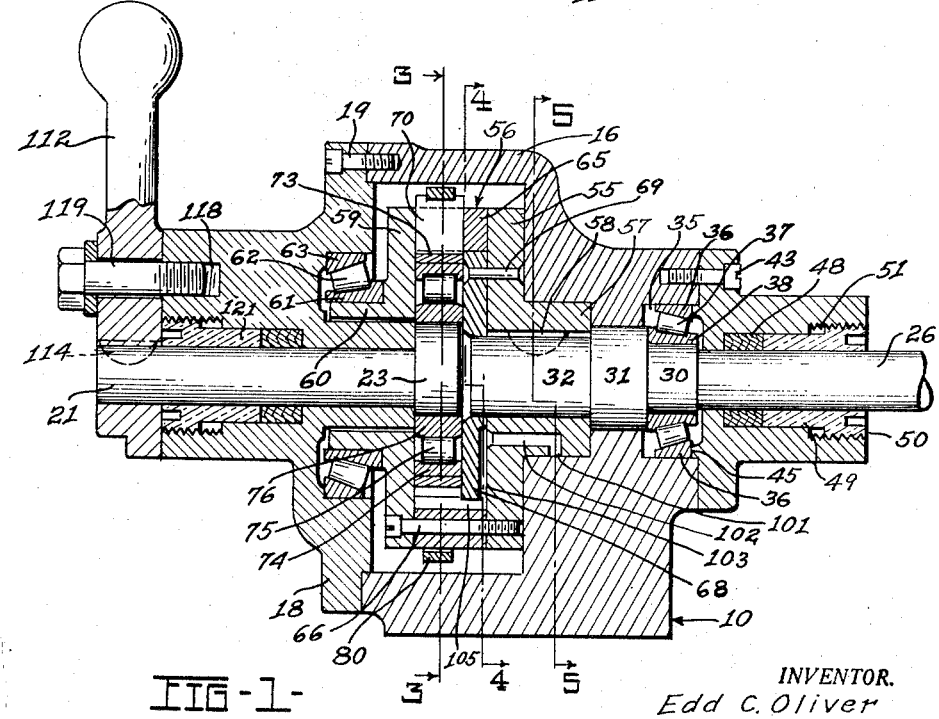
FIG-1-
INVENTOR.
Edd C. Oliver
BY Harry O. Ernsberger
ATTORNEY.

May 15, 1951      E. C. OLIVER      2,552,860
FLUID POWER DEVICE
Filed June 27, 1945      3 Sheets-Sheet 2
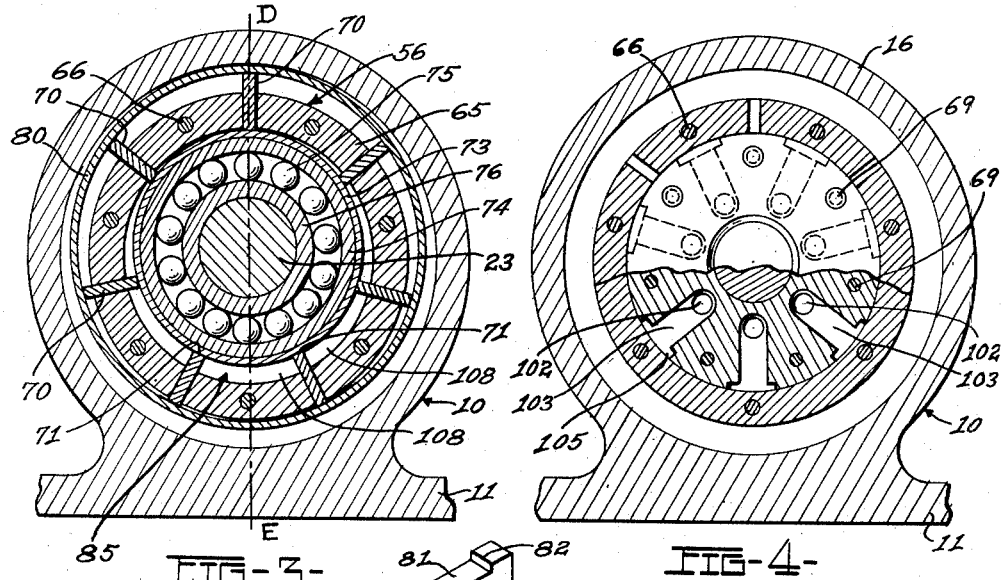
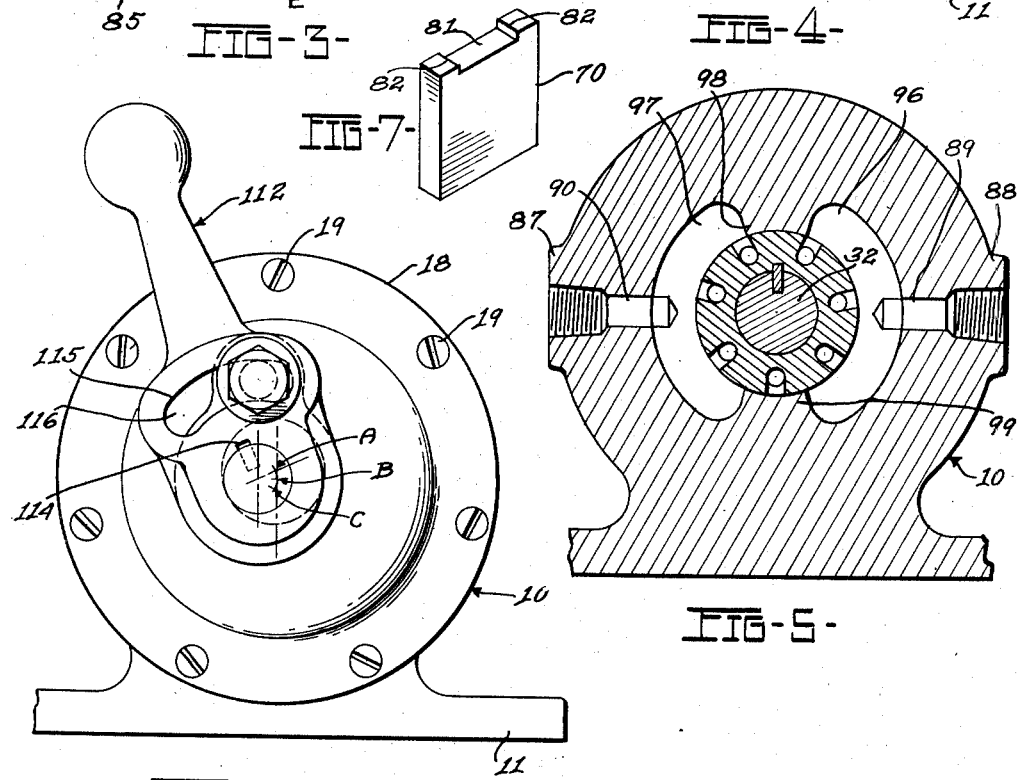
INVENTOR.
Edd C. Oliver
BY Harry O. Ernsberger
ATTORNEY May 15, 1951     E. C. OLIVER     2,552,860
FLUID POWER DEVICE
Filed June 27, 1945     3 Sheets-Sheet 3
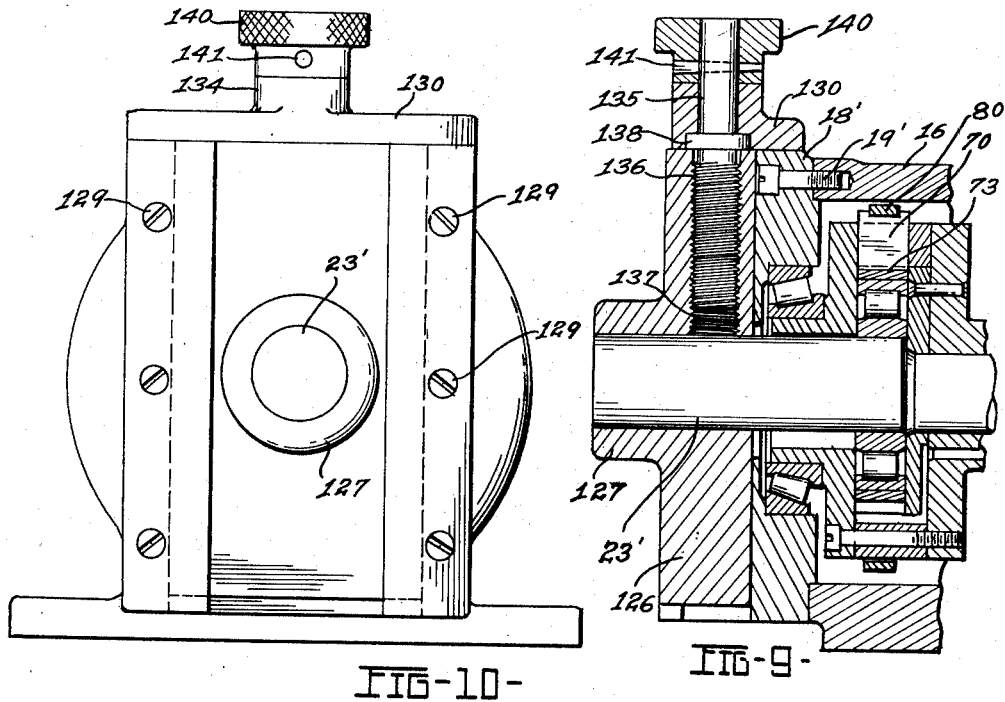
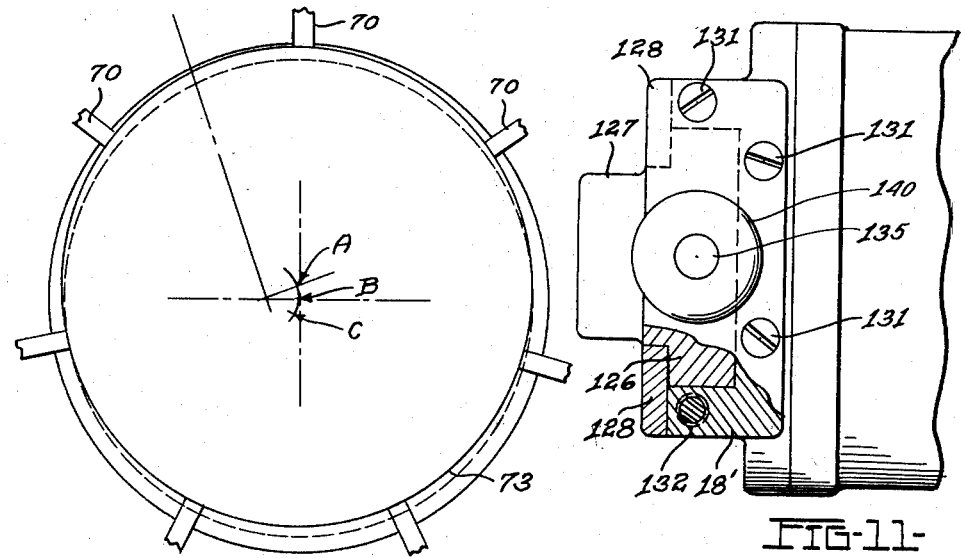
INVENTOR.
Edd C. Oliver
BY Harry O. Ernsberger
ATTORNEY Patented May 15, 1951

2,552,860

UNITED STATES PATENT OFFICE 2,552,860

FLUID POWER DEVICE

Edd C. Oliver, Adrian, Mich.; Genevieve R. Oliver, executrix of said Edd C. Oliver, deceased, assignor to Genevieve R. Oliver, Adrian, Mich.

Application June 27, 1945, Serial No. 601,890

4 Claims. (Cl. 103—120)

This invention relates to a fluid power device and more particularly to a mechanism especially adaptable as a driven instrumentality or pump utilizing a fluid preferably a liquid, as for example oil as a power transmitting medium, the fluid power device being useable as a fluid motor if desired. When the fluid power device of my invention is utilized as a pump, the rotor of the mechanism derives its rotational movement by applied mechanical or electrical means and functions to pump or convey fluid through the device. When the power device is utilized as a fluid motor, the fluid pressure is directed through the rotor, the fluid pressure causes rotation of the rotor, a transition of fluid pressure to rotary mechanical movements.

The invention embraces the provision of a fluid power device especially adaptable for use as a fluid pump in which the elements and vanes forming fluid receiving and transferring chambers rotate as a unitary structure whereby friction of moving parts is reduced to a minimum.

An object of the invention resides in the provision of a fluid power device in which units or elements of the device are rotatable about independent axes and which are arranged for relative shifting movements to vary the volume of the fluid transferring chambers formed in the device.

The further object of the invention is the provision of a fluid pump or instrumentality in which the fluid receiving and transferring chambers may be varied and controlled by lateral shifting of an axis of certain of the rotatable elements with respect to the axis of other rotatable elements of the pump.

Another object of the invention resides in a fluid pump or instrumentality in which effective pumping of fluid may be had in one direction of fluid flow and at a controllable variable rate by shifting the relative position of the axes of rotation of various elements of the pump, and in which pumping may be eliminated or effective pumping of fluid in a reverse direction accomplished by further relative shifting of said axes, all of it may be accomplished while the elements of the pump are rotating at a constant speed in one direction.

Still another object is the provision of a variable volume reversible fluid pump in which a component of the pump is laterally movable with respect to the axis of rotation of other components of the pump and in which adjustment and control of the axis may be accomplished through continuous operation of the pump to reduce the pump's effectiveness to zero, or to obtain a maximum pumping effect of fluid flow in either direction without interfering with or changing the speed of rotation of the pump's rotor construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a vertical sectional view illustrating a form of fluid power device of my invention;

Figure 2 is a top plan view of the construction shown in Figure 1, part of the apparatus being shown in section for purposes of illustration;

Figure 3 is a vertical sectional view taken substantially on the line 3—3 of Figure 1;

Figure 4 is a vertical sectional view taken substantially on the line 4—4 of Figure 1;

Figure 5 is a vertical sectional view taken substantially on the line 5—5 of Figure 1;

Figure 6 is an end view of the construction shown in Figure 1;

Figure 7 is an isometric view illustrating one of the vanes forming a part of the device;

Figure 8 is a diagrammatic view illustrating positions of a shiftable element of the pump;

Figure 9 is a vertical sectional view illustrating a modified form of adjusting means for shifting one of the pump elements;

Figure 10 is an end view of the construction shown in Figure 9, and

Figure 11 is a top plan view of the construction shown in Figure 9, part of the structure being broken away for purposes of illustration.

It is to be understood that while I have shown the arrangement of my invention as embodied in physical form of a structure particularly adaptable as a fluid pump or which may be utilized as a motor actuated by fluid under pressure, it is contemplated that my invention may be incorporated in other instrumentalities, or used in conjunction with other mechanisms or arrangements wherever the same may be found to have utility.

Referring to the drawings in detail, and first with reference to the form of the invention as disclosed in Figures 1 through 7 wherein such embodiment is particularly operable as a fluid pump, the arrangement is inclusive of a support or housing 10 integrally formed with a base portion 11 provided with openings 12 to receive bolts (not shown) for mounting the housing or support upon any suitable surface. The exterior of the housing is generally of circular configuration and is formed with a hollow interior or chamber 15 which is provided in an enlarged portion 16 of the housing or support 10. One end of the housing 10 is adapted to receive a closure or member 18 which is secured to the housing by a means of plurality of threaded members or screws 19 extending into threaded openings formed in the peripheral end wall portion of the housing. The member 18 is bored to receive a shaft 21 which carries at its inner end an eccentric cylindrical portion or member 23, the surface of the latter being generated about an axis out of alignment with the axis of shaft 21. The shaft 21 is arranged for limited rotational movement for changing or shifting the relative position of the eccentric member 23 for purposes to be hereinafter explained.

The housing 10 is formed to receive a shaft 26 upon which a rotor construction is assembled as hereinafter described. The shaft 26 extends into the housing and terminates adjacent to but slightly spaced from the eccentric portion 23 of shaft 21. A portion of the shaft 26 extends exteriorly of the housing 10 and is adaptable to receive or be connected to a sleeve or coupling (not shown) for connecting the fluid power device to a source of power when used as a pump or to mechanisms to be driven when the device is utilized as a fluid motor.

The shaft 26 is formed with a series of cylindrical portions 30—31—32 of different diameters as particularly shown in Figure 1. The housing 10 is formed with a portion 17 which is provided with a recess 35 adapted to receive and accommodate the outer race 36 of a roller or other antifriction bearing 37, the inner race 38 of the bearing being snugly fitted upon portion 39 formed on shaft 26. A stuffing gland construction surrounds shaft 26 and is mounted in a cap or closure 42 secured to the housing 10 by means of screws 43 which extend into threaded openings formed in the wall of the reduced portion 17 of the housing 10. The closure 42 is formed with an annular flange portion 45 which mates with a boss portion 44 formed on the housing to form a tight joint and accurately position the cap 42. The cap 42 is formed with a cylindrical recess surrounding the shaft 26 in which is disposed packing or sealing material 48 which is compressed into sealing engagement with shaft 26 by means of a bushing 49, the latter having an enlarged threaded portion 50 co-operating with a threaded opening 51 in the closure 42.

It should be noted that the inner race 38 of the roller bearing 37 abuts the cylindrical portion 31 formed on the shaft 26, while the annular shoulder 45 engages and properly positions the outer race 36 of the bearing 37.

Mounted upon the cylindrical portion 32 of the shaft 26 is an element or plate 55 forming a part of a rotor or rotor construction 56, a hub portion 57 of the element 55 being secured to portion 32 of shaft 26 by means of a key 58. Spaced from the element 55 is another similarly shaped plate or element 59 which is formed with a hub or projection 60 upon which is mounted the inner race 61 of a roller or other suitable antifriction bearing 62, the outer race 63, of the bearing being disposed in a suitable cylindrical recess formed in the closure or member 18.

Disposed between the elements 55 and 59 is an annular element or ring 65 provided with a series of spaced openings which register with openings in elements 55 and 59 and which are adapted to receive screws 66 for securing elements 55, 59, and 65 in fixed or assembled relationship. As shown in Figure 1, a disc-like plate or element 68 is fixedly secured to element 55 by rivets 69 or other suitable means. The annular element 65 is formed with a plurality of spaced kerfs or slots adapted to snugly yet slidably receive and accommodate vanes or blades 70. The inner edges or edge surfaces 71 of the vanes are adapted to abut or engage the exterior cylindrical surface of another annular element 73 which surrounds and is fitted upon the outer race 74 of an antifriction or roller bearing 75, the inner race 76 of bearing 75 being snugly fitted upon and supported by the portion 23 on shaft 21.

The vanes or blades 70 are constantly urged into engagement with the exterior surface of annular member 73 under the influence of a band, annulus or other suitable retaining means 80 which in the embodiment illustrated embraces or overlies the outermost ends or end surfaces 81 of the vanes 70. As shown in Figures 1 and 7, each of the vanes 70 is formed on its outer edge portion with the recessed surface 81 bounded laterally by shoulders 82, the recess 81 being adapted to accommodate and position the annular vane retaining means or band 80.

It should be noted from Figures 1 and 3 that when the portion or member 23 is in the position illustrated, i. e., with projection 23 eccentrically disposed with respect to the axis of shaft 26 that there is formed between the exterior surface of element 73 and interior surface of element 65, a crescent-like configuration or space 85 which is divided by means of the vanes 70 into a plurality of fluid receiving or pumping chambers 108.

As will be seen from Figures 1, 2, 4 and 5, the housing or support is formed with projecting bosses 87 and 88 which are bored to form fluid conduits 89 and 90 having enlarged threaded entrances adapted to receive the threaded extremities of fluid conveying pipes 93 and 94 as shown in Figure 2. The conduits or passages 89 and 90 are in communication respectively with sector-shaped reservoirs or chambers 96 and 97 as shown in Figure 5. It should be noted that the chambers 96 and 97 are separated by means of walls or abutments 98 and 99 integrally formed with the housing 10 and terminating at the peripheral surface of the hub portion 57 of element, and while the exterior cylindrical surface of the hub is closely fitted within the abutments 98 and 99, sufficient clearance is provided to permit rotation or running fit of the hub 57 in the housing 10.

As shown in Figures 1 and 5 the hub portion 57 is provided with a series of spaced radially extending ducts or passages 101, each of the ducts 101 being in communication with ducts 102 provided in the hub portion 57 of member 55 and extending in a direction parallel with the axis of shaft 26. As particularly shown in Figure 4, the ducts 102 are arranged in registration with radially disposed passages or recesses 103 formed in a wall of the plate or element 68 which, in cooperation with inner wall of element 55, forms a series of ducts or channels of substantially rectangular cross section. The periphery of plate 68 is provided with a series of recesses or passages 105 which are in communication with channels 103, each of passages 105 being in communication with one of the fluid receiving and conveying chambers 108 formed by reason of the vanes 70 subdividing the crescent shaped space 85.

My invention is inclusive of means for adjusting or shifting the position of the member 23 and annular element or ring 73 with respect to the axis of shaft 21 for the purpose of accomplishing several novel and advantageous results. By adjusting the relative position of the members or elements 23 and 73, the volume of fluid or oil passing through the fluid power device may be controlled and varied by varying the size of the pumping chambers or pockets 108. The member 23 is arranged to be shifted to a neutral or central position in which the axis of member 23 is in alignment with the rotor shaft 26, in which position the rotor construction may revolve or rotate without effecting any pumping action of the device by reason of the fact that all of the fluid receiving or pumping chambers 108 do not vary in size during rotation. The member 23 and ring 73 may be further shifted through the central or neutral position so as to cause the rotor device or construction to pump fluid in a reverse direction without changing the speed or direction of rotation of the rotor construction.

The adjusting means for member 23 and ring 73 includes a manipulating arm or member 112 which is secured to the extremity of shaft 21 by means of a key 114. A suitable locking means is provided for retaining the adjusting means in adjusted position. In the embodiment illustrated in Figures 1 and 6, the member 112 is provided with a boss portion 115 formed with an arcuately arranged slot or opening 116. The end closure 18 is provided with a threaded opening 118 adapted to receive a threaded member 119 or other suitable means for holding the arm 112 in adjusted position. Leakage of fluid from chamber 15 along the shaft 21, is prevented by means of a stuffing gland 121 surrounding shaft 21, and is of the same general construction as the stuffing gland 48, 49 surrounding the shaft 26.

As indicated in Figures 6 and 8, point A indicates the axis of eccentric member 23 in its extreme uppermost position, point B illustrates the neutral or central position thereof, in which position no pumping effect will be obtained even though the pump rotor is revolving, while point C indicates the axis of member 23 in its lowermost position viz, a position of reversible pumping action.

The operation of the embodiment of the invention illustrated in Figures 1 through 8 inclusive is as follows:

The fluid power device when used as a fluid pump requires the application of power to rotate the shaft 26, hence causing rotation of the rotor construction 56 including elements 55 and 59, annular element 65, annulus or ring 73 and vanes 70. It should be noted that these elements and vanes together constitute a rotatable pumping instrumentality when the axis of ring 73 is out of alignment with the axis of shaft 26 in which the parts rotate together and wherein a very small relative sliding movement takes place between the vanes and associated elements thus reducing friction and wear to a minimum and obtaining a maximum of operating efficiency. As the element 55 is keyed to the shaft 26, the element 55 carrying with it the vane driving means or element 65, serves to drive or move the vanes or plates 70 with the rotor construction. As will be seen from Figures 3, 6, and 8, with the projection or member 23 and annular ring 73 at their uppermost position at a maximum degree of eccentricity on one side of point B, the axis of the rotor shaft 26, the eccentric relation between the annular ring 73, rotating annulus 65 and vanes 70 causes radial reciprocatory movement of the vanes 70 as they are bodily carried by the annulus 65 in its rotative movement. As the vanes 70 move radially inwardly and outwardly, the pockets or pumping chambers 108 vary in volume from a minimum size as illustrated at the uppermost central portion of Figure 3, to the maximum volume attained by a chamber 108 as illustrated at the lower portion of Figure 3. Thus with the adjusting means or arm 112 set in the position indicated in Figure 6 with the member 23 and ring 73 in their maximum uppermost position of eccentricity, a pocket 108 disposed between pairs of vanes 70 and of a minimum size, reaches its maximum volumetric capacity or size and returns to its minimum size during a complete revolution of the rotor. By reason of the continuous increase and decrease in the volumetric size of the pockets or chambers 108 during rotation of the rotor, a suction or lowered pressure is developed in each pocket or chamber during an increase in the size thereof, and reciprocally, higher pressure is developed in the pockets or chambers 108 as they decrease in size. Thus, assuming that the rotor construction is rotating in a clockwise direction as viewed in Figures 3 and 4, certain of the ducts 101, 102, 103 and 105 are in communication with the chamber or reservoir 96 containing fluid, as for example oil, which is conveyed to the chamber 96 through a pipe or conduit 93. As the pumping chambers 108 are enlarged or increased in volume in the right-hand 180 degrees of rotative movement of the rotor, viz., that sector of rotation to the right of the plane DE in Figure 3, suction or reduced pressure is being set up in the enlarging chambers. The reservoir 96, and ducts connecting the pockets 108 and the reservoir provide passages so that oil or other fluid in the reservoir or chamber 96, conveyed to it by pipe 93 from a source of supply, flows through the communicating ducts 101, 102, 103 and 105 into the enlarging pockets 108 formed by the walls of the vanes 70, elements 59 and 68, the exterior peripheral surface of the annulus 73 and the interior surface of the vane driving element 65. By referring specifically to the disclosures of Figures 3 and 5, it will be noted that as the entrances of ducts 101 are closed as they move past the abutment or wall 99, the pocket whose entrance 101 is blocked off is thus out of communication with the fluid reservoir 96. This would be the condition of the lowermost pocket 108 as shown in Figure 3 and the lowermost duct 101 in communication therewith shown in Figure 4. As the rotor continues in its clockwise rotation, the pockets on the left-hand 180 degree arc of movement of the rotor, i. e., the arc at the left of the plane DE, are caused to decrease in size, thus setting up pressure upon the fluid trapped in the pockets by reason of their decreasing size. As the pockets on the left-hand 180 degree arc of movement of the rotor are then in communication with the chamber 97 through the communicating ducts 101, 102, 103 and 105, the fluid or oil from the pockets 106 which are decreasing in size is extruded or forced under pressure into the receiving reservoir or chamber 97, from whence the oil may be directed through the outlet 90 and tube 94 to actuate or operate mechanisms, apparatus, or for any other useful purpose desired.

It should be noted that as the vanes 70 are being carried or rotated by the annular element 65, the vanes 70 slide radially with respect to the annulus 65 in engagement therewith; the inner radially sliding distance traversed by each vane during one revolution of the rotor being equal to substantially twice the eccentricity of portion 23, that is, four times the lateral dimension between the axes of the shaft 26 and member 23. As the several elements constituting the rotor and the vanes are rotated simultaneously, there is a very small arcuate or peripheral relative reciprocation between the ends or end surface of the vanes in engagement with the inner annulus or element 73 and the vane retaining band 80. Thus the only relative sliding friction is the radial linear movement of the vanes and a slight reciprocatory arcuate movement of the vanes with respect to the annular elements 73 and 80. It will therefore be seen that in my power device, sliding friction is reduced to a minimum, and consequently there is no appreciable drag between the vanes and the members or elements in engagement therewith. This arrangement reduces wear of the parts and greatly prolongs the life of the mechanism, eliminates or greatly minimizes leakage of fluid as well as requiring much less power to actuate the rotor and vane construction.

The pumping effectiveness of the fluid power device may be regulated, the direction of fluid flow from the pump may be completely reversed, or the flow of fluid may be reduced to zero without stopping rotation of the rotor 56 and shaft 26. This may be accomplished simply by manipulation of the arm or lever 112 which controls the relative position of member 23 and the annular member 73. By loosening the bolt or threaded member 119, the arm 112 may be moved in a clockwise direction as viewed in Figure 6, such movement causing the axis A of the eccentrically disposed member 23 to approach the neutral position or point B as illustrated in Figures 6 and 8. The arm 112 may be locked in any position by simply tightening the bolt 119. As point A is moved closer to neutral position indicated by B, such movement causes the axis of member 23 and annular member 74 to approach point B which is in concentric relationship to the vane carrying element 65 and hence to affect a decrease in the size of the pockets or pumping chambers 108. Should the arm 112 be moved to a position in which point A is coincident with point B, i. e., with the axis of member 23 and annular ring 73 in alignment with the shaft 26, these elements are then in true concentric relationship with respect to the annular elements forming in the component parts of the rotor, in which position the rotor construction even though rotating, does not cause any pumping action as the vanes 70 will not be caused to move radially, and hence there is no increase or decrease in the sizes of the pumping chambers or pockets 108. This neutral position of the surface of ring 74 is indicated in broken lines in Figure 8.

By moving the arm 112 further in a clockwise direction as viewed in Figure 6, the pumping chambers or pockets 108 of the larger size are formed above the axis of rotation of the rotor as viewed in Figure 3, and thus the pumping action of the device will be reversed, viz., the fluid or oil is taken into the pockets 108 from the reservoir 97, and delivered under pressure set up by the pumping action of the vanes into the reservoir 96. A maximum pumping position in a reverse direction of fluid flow is obtained when the arm 112 is moved to its maximum clockwise position to bring the axis of the member 23 and the annular member 73 to the position indicated by point C in Figures 6 and 8. Thus the effective pumping action in a reverse direction of fluid flow may be obtained with the axis of member 23 arranged along the locus bounded by points B and C, the further away the axis being from point B, the larger pumping pockets 108, consequently the more volume of oil will be pumped through the device. These adjustments of arm 112 and the components or elements controlled thereby for regulating the pumping effectiveness, direction of fluid flow, or neutral position of the device are accomplished without interfering with the rotation of the driving shaft 26 and the rotor construction 56.

It will thus be seen that the device of my invention is readily adapted for use with machine tool control mechanisms and the like or wherever it is desirable to obtain a variable rate of flow of fluid, or stop the fluid flow, or completely reverse its direction of flow, any or all of which may be had while the rotor is continuously operating in one direction of rotation.

Figures 9 through 11 inclusive illustrate a modified form of adjustable control means for regulating the effectiveness or direction of fluid flow of the pumping device. In this embodiment of the invention there is secured to the portion 16 of the pump housing or support 10 a modified form of closure 18' which is held in position by means of screws 19'. In this form of construction the member 23' is elongated and projects into and snugly fits a bore formed in a vertically adjustable member or slide 126, a comparatively long bearing surface being provided for member 23' by reason of a projecting hollow boss portion 127 formed on the slide. As particularly shown in Figures 10 and 11 the vertical movable member 126 is retained between suitable ways or bars 128 which are secured to member 126 by means of screws 129.

Disposed above the closure member 18' is a cap or member 130 which is secured thereto by means of screws 131 extending into threaded openings 132 formed in member 18'. The cap 130 is formed with an upwardly extending boss 134 which is bored to receive a tenon portion 135 of a threaded member 136. The slidable member 126 is provided with a threaded opening 137 to receive the threaded member 136. The member 136 is formed integrally with a collar 138 which is disposed in a recess formed in cap 130. A manipulating means or knob 140 is provided which is secured to the upper end of the tenon 135 by means of a dowel or pin 141 extending through registering openings formed in the manipulating knob 140 and the tenon portion 135. A square type of thread is preferably used on member 136 in order to minimize wear.

By rotating the manipulating knob 140 rotation of threaded member 136 is effected, and as the threaded member 136 is held in a relatively stationary position by engagement of collar 138 with member 130, vertical movement is imparted to the slide 126, the direction of movement of the slide depending upon the direction of rotation of knob 140. Thus vertical movement of slide 126 carrying with it the member 23', the bearing 75 and the annular member 73, will vary the position of these elements or members to regulate the size of the pumping pockets or chamber 108 to obtain the same adjustments and control of the effective pumping action of the pump and the direction of the fluid therethrough in the same general manner as is obtained by the arrangement shown in the embodiment of Figures 1 and 6. In the form of controlling means illustrated in Figures 9 through 11 inclusive, the axis of member 23' is movable in a vertical plane, while in the form shown in Figures 1 and 6 the axis of member 23 moves in an arc as exemplified in Figure 6 and the diagrammatic illustration in Figure 8.

When the forms of my invention herein disclosed are utilized as a fluid motor, i. e. when they are actuated by fluid under pressure conveyed to the pumping chamber 108, the speed of the rotor so driven may be regulated by changing the relative position of members 23 or 23' and the direction of movement of the rotor may be reversed when members 23 or 23' are moved to the opposite side of point B illustrated in Figures 6 and 8. By utilizing two instrumentalities of my invention as disclosed herein and connecting the devices in series through connection of the fluid pressure line from one instrumentality to a second instrumentality, a variable speed transmission device useable for many purposes may be obtained. When two of the devices of my invention are so used, one as a pump and the other as a fluid driven motor, the control is preferably effected by moving the eccentric of the pump device, which varies the flow of fluid to the motor and hence changes the speed of the latter. The eccentric control of the motor device of such a tandem arrangement may be adjusted to any position at one side of the central or neutral position, and thus vary the speed of the motor by fluid conveyed to it from the pump. It should be noted in this connection that moving the eccentric in the fluid device used as a motor toward the central or neutral position lessens the volume of the fluid chambers in the motor, and hence causes an increase in the speed of the motor rotor. When the fluid pump of such a pump and motor arrangement is in operation, the axis of the eccentric of the fluid motor must be out of alignment with the axis or center of the motor rotor shaft, as the motor will not rotate when the axis of the eccentric and the axis of the motor rotor shaft are in alignment. This is due to the fact that there will then be no change in the size of the fluid receiving chambers of the fluid motor rotor during rotation thereof.

It is apparent that, within the scope of the invention, modifications and different arrangements may be made other than is herein disclosed, and the present disclosure is illustrative merely, the invention comprehending all variations thereof.

What I claim is:

1. In combination a support, a rotor including a pair of disc-like elements secured together and journaled for rotatable movement on said support; an annular element disposed between said disc-like elements; said annular element being formed with a plurality of slots; radially movable vanes slidably disposed in said slots; an annular member disposed between said disc-like elements, the exterior cylindrical surface of said annular member adapted to be engaged by the inner edge walls of said vanes; said annular member being arranged for rotation concurrently with the rotation of said rotor; said disc-like elements, vanes and annular element and member forming a plurality of fluid receiving chambers; fluid inlet and outlet passages formed in said support and arranged for communication with said fluid receiving chambers; means including a deformable band engageable with the outer edge walls of said vanes for urging the latter into frictional engagement with the annular member; a shaft member; said annular member being journaled for rotation upon said shaft member; said support being formed with a pair of guides; a member carrying said shaft member and arranged for movement in said guides; means cooperating with said shaft supporting member for moving said shaft member laterally with respect to the axis of rotation of said rotor.

2. In combination a support, a rotor including a pair of disc-like elements secured together and journaled for rotatable movement on said support; an annular element disposed between said disc-like elements; said annular element being formed with a plurality of slots; radially movable vanes slidably disposed in said slots; an annular member disposed between said disc-like elements, anti-friction bearing means for supporting said annular member for rotation concurrently with the rotation of said rotor the exterior cylindrical surface of said annular member adapted to be engaged by the inner edge walls of said vanes; means including a deformable band adapted to be resiliently tensioned into engagement with the outer edge walls of said vanes for urging the latter into engagement with the annular member; said vanes, disc-like elements, annular element and member forming a plurality of fluid pumping chambers; a shaft member; said annular member being journaled for rotation upon said shaft member; said support being formed with guide means; a member carrying said shaft and arranged for slidable movement in said guide means; and threaded means cooperating with said shaft member for moving the shaft member laterally with respect to the axis of rotation of said rotor to vary the capacity of said fluid pumping chambers.

3. In combination, a support; a rotor construction including a pair of disc-like elements secured together and journaled for rotatable movement on said support; an annular element disposed between said disc-like elements and secured thereto; said annular element being formed with a plurality of spaced slots; radially movable vanes slidably disposed in said slots; an annular member having an exterior cylindrical surface; anti-friction bearing means supporting said annular member; said vanes slidably engaging the exterior cylindrical surface of said member and forming with said disc-like elements and said annular element a plurality of fluid pumping chambers; said annular member being arranged for transverse movement relative to the rotor construction, and an annular deformable band engageable with the outer edge walls of said vanes for urging same into engagement with the exterior cylindrical surface of the annular member.

4. In combination, a support; a rotor including a pair of disc-like elements secured together and journaled for rotatable movement on said support; an annular element disposed between said disc-like elements and secured thereto; said annular element being formed with a plurality of spaced slots; radially movable vanes slidably disposed in said slots; an annular member having a cylindrical surface; said annular member being arranged for rotation concurrently with the rotation of said rotor; said vanes frictionally engaging the cylindrical surface of said annular member and forming with said disc-like elements and said annular element a plurality of fluid pumping chambers; a plurality of fluid passages communicating with said pumping chambers; said annular member being arranged for lateral movement relative to the rotor for changing the size of said chambers and the direction of fluid flow therethrough and through said fluid passages during rotation of said rotor, and an annular deformable band engageable with the outer edge walls of said vanes for urging same into engagement with the cylindrical surface.

EDD C. OLIVER.

REFERENCES CITED

The following references are of record in the file of this patent:

UNITED STATES PATENTS

| Number | Name | Date |
|---|---|---|
| 1,044,846 | Barbarou | Nov. 19, 1912 |
| 1,310,945 | De Martino et al. | July 22, 1919 |
| 1,988,213 | Ott | Jan. 15, 1935 |
| 2,035,465 | Erskine et al. | Mar. 31, 1936 |
| 2,061,950 | Ott | Nov. 24, 1936 |
| 2,266,191 | Granberg | Dec. 16, 1941 |
| 2,307,851 | Musick et al. | Jan. 12, 1943 |
| 2,348,428 | Tucker | May 9, 1944 |

FOREIGN PATENTS

| Number | Country | Date |
|---|---|---|
| 98,594 | Austria | Nov. 25, 1924 |
| 264,996 | Italy | May 20, 1929 |
| 314,622 | Great Britain | July 4, 1929 |
| 528,170 | Germany | Mar. 20, 1933 |